US012640491B1

(12) United States Patent
Dana et al.

(10) Patent No.: US 12,640,491 B1
(45) Date of Patent: May 26, 2026

(54) OPTICALLY TRANSPARENT RADIO FREQUENCY REFLECTARRAY DEVICES FOR BEAM REDIRECTION AND BROADENING

(71) Applicant: Panasonic Industry Co., Ltd., Kadoma (JP)

(72) Inventors: Aykutlu Dana, Palo Alto, CA (US); Ragip A. Pala, Pleasanton, CA (US); Arash Ahmadivand, Pleasanton, CA (US); Asman Tamang, Fremont, CA (US); Yaroslav A. Urzhumov, Pleasanton, CA (US)

(73) Assignee: Panasonic Industry Co., Ltd., Osaka (JP)

( * ) Notice: Subject to any disclaimer, the term of this patent is extended or adjusted under 35 U.S.C. 154(b) by 281 days.

(21) Appl. No.: 18/376,403

(22) Filed: Oct. 3, 2023

Related U.S. Application Data

(60) Provisional application No. 63/412,789, filed on Oct. 3, 2022.

(51) Int. Cl.
*H01Q 15/14* (2006.01)
*H01Q 1/48* (2006.01)

(52) U.S. Cl.
CPC ............... *H01Q 15/14* (2013.01); *H01Q 1/48* (2013.01)

(58) Field of Classification Search
CPC ............. H01Q 15/0013; H01Q 15/008; H01Q 15/0086; H01Q 15/14; H01Q 1/38; H01Q 1/48; H01Q 21/065
See application file for complete search history.

(56) References Cited

U.S. PATENT DOCUMENTS 9,748,663 B2 * 8/2017 Wong .................... H01P 1/2005
10,892,547 B2 * 1/2021 Rakib .................. H01Q 21/065
2021/0249778 A1 * 8/2021 Achour .............. H01Q 15/0026

* cited by examiner

*Primary Examiner* — Hasan Islam
(74) *Attorney, Agent, or Firm* — WHDA, LLP

(57) ABSTRACT

The present disclosure provides optically transparent reflectarrays, and methods of constructing and using such reflectarrays.

8 Claims, 12 Drawing Sheets

OPTICALLY TRANSPARENT RADIO FREQUENCY REFLECTARRAY DEVICES FOR BEAM REDIRECTION AND BROADENING

CROSS REFERENCE TO RELATED APPLICATION

This application claims the benefit under 35 U.S.C. § 119(e) from U.S. Provisional Application No. 63/412,789, entitled "Optically Transparent Radio Frequency Reflectarray Devices For Beam Redirection And Broadening," filed on Oct. 3, 2022. The entirety of the disclosure of the foregoing document is incorporated herein by reference.

TECHNICAL FIELD

The present disclosure relates to metasurfaces. More specifically, the present disclosure relates to optically transparent radio frequency reflectarrays for beam redirection and broadening.

BACKGROUND INFORMATION

Lenses naturally focus or defocus a collimated beam into a cone, thereby increasing the angular spread of the beam in the far field. Fresnel lenses have been traditionally used to convert conventional spherical lenses into planar components.

More recently, metalenses have become available, which are based on implementing the spatially dependent phase of a lens using resonant or non-resonant subwavelength structures on a surface. Reflectarrays include metasurfaces that reflect a collimated RF beam imitating a convex or concave parabolic reflector on a surface. The reflection phase range used to implement an arbitrary metasurface of the reflectarray is about 0° to about 360°.

Reflectarrays have been developed using printed circuit board (PCB) materials, i.e., copper and fiberglass reinforced epoxy resin laminate (FR4), which is a dielectric base. Such materials, however, are unsuitable for use in windows or other structures where transparency is desired.

Thus, there remains a need for transparent reflectarrays suitable for structures where transparency is desired, such as those having about 0 to about 360 degrees control, low sensitivity to angle of incidence (AOI), polarization, or frequency of operation, and high efficiency.

SUMMARY

It has been discovered that metallic meshes such as Nanoweb can be to improve transparency and conductivity of reflectarrays. This discovery has been exploited to provide the present disclosure, which in part, includes reflectarrays with beam broadening and/or beam deflection characteristics. The disclosed reflectarrays have low sensitivity to angle of incidence (AOI), polarization, or frequency of operation, and high efficiency. The conditions for resonant patch arrays, such as phase profiles, patch sizes, and periodicity for given angles of incidence can be obtained for beam broadening and/or redirection devices.

In one aspect, a reflectarray comprises an optically transparent substrate and a metasurface including an array of resonant patches disposed over the optically transparent substrate, each resonant patch including a first optically transparent conductor. The thickness of the substrate is selected to shift the resonance of the substrate beyond a fundamental resonance at a design frequency of the metasurface. The design frequency of the metasurface may also be referred to as the design frequency of the patch. The reflectarray also includes an optically transparent ground plane including a second optically transparent conductor under the optically transparent substrate.

In some examples, which may be combined with each of the examples described above, the reflectarray includes a plurality of unit cells, each unit cell comprising one resonant patch, a portion of the optically transparent substrate, and a portion of the ground plane.

In some examples, which may be combined with each of the examples described above, the patch may be ring-shaped, square, rectangular, or circular shaped.

In some examples, which may be combined with each of the examples described above, a size of each unit cell is less than $\lambda_{0\,0}/4$ to $\lambda_{0\,0}/2$ in free space, $\lambda_{0\,0}$ being a wavelength of an RF wave in free-space corresponding to the design frequency of the metasurface.

In some examples, which may be combined with each of the examples described above, the size of each unit cell of the plurality of unit cells varies with an angle of incidence (AOI).

In some examples, which may be combined with each of the examples described above, the reflectarray has a reflection profile configured to be a beam broadening device, the reflection profile implementing a convex cylindrical mirror array of an aperture size from about 3 $\lambda_{0\,0}$ to about 100 $\lambda_{0\,0}$ and a focal length of about 3 $\lambda_{0\,0}$ to about −200 $\lambda_{0\,0}$.

In some examples, which may be combined with each of the examples described above, the metasurface comprises a phase profile determined by equation:

$$\varphi_{focus}(x) = \frac{2\pi}{\lambda_0} \times \left(f - \sqrt{x^2 + f^2}\right)$$

wherein f is a focal length.

In some examples, which may be combined with each of the examples described above, the reflectarray has a reflection profile configured to be a beam deflector and to implement an Echelle grating having an aperture size of about 3 $\lambda_{0\,0}$ to about 30 $\lambda_{0\,0}$ and a blazing angle of about 1° to about 40°.

In some examples, which may be combined with each of the examples described above, the metasurface comprises a linear phase gradient.

In some examples, which may be combined with each of the examples described above, at least one resonant patch of the array of resonant patches comprises a square, a rectangular shape, a circular shape, a triangular shape, or a ring shape.

In some examples, which may be combined with each of the examples described above, the metasurface has a sheet resistance of equal to or less than about 50 ohms/sq.

In some examples, which may be combined with each of the examples described above, a phase of the metasurface ranges from about 180° to about −180°.

In some examples, which may be combined with each of the examples described above, the reflectarray has an efficiency equal to or greater than about 80%.

In some examples, which may be combined with each of the examples described above, an RF wave produced by the reflectarray has a frequency ranging from about 5 GHz to about 30 GHZ.

In some examples, which may be combined with each of the examples described above, the reflectarray is optically transparent and has a transmittance equal to or greater than 80% in wavelengths ranging from about 365 nm to about 850 nm.

In some examples, which may be combined with each of the examples described above, the optically transparent substrate comprises glass or a polymer.

In some examples, which may be combined with each of the examples described above, the metasurface may include silver (Ag), indium tin oxide (ITO), or nanoparticle-doped silica.

In some examples, which may be combined with each of the examples described above, the metasurface may include nanowire meshes made by one of electrospun fiber templates, crack lithography, or spinning layers of metallic nanowires.

In some examples, which may be combined with each of the examples described above, the metasurface may include mesh of an electrical conductive material made by one of photolithography, laser ablation, or nanoimprint lithography.

In another aspect, a method is provided for designing the reflectarray. The method includes selecting a thickness of the optically transparent substrate to ensure that an interference resonance is away from a fundamental resonance at the design frequency of the metasurface. Starting dimensions for the patch are then calculated based on the dielectric constant of the optically transparent substrate and the design frequency. A computation model is then generated, which performs wave simulations at a plurality of angles of incidence using the starting dimensions of the patch. Higher-order resonances of the patch obtained from the wave simulations are then analyzed while adjusting the size of a unit cell of the reflectarray in the wave simulations until an adjusted unit cell size is found for which the higher-order resonances are away from the design frequency and do not interfere with the fundamental resonance at the design frequency at one of the plurality of angles of incidence. The method also includes storing the adjusted unit cell size in a non-transitory computer-readable storage medium as a design parameter for constructing the reflectarray.

In some examples, which may be combined with each of the examples described above, the method may also include selecting the aperture size for a convex cylindrical mirror type reflectarray.

In some examples, which may be combined with each of the examples described above, the angular width is determined by Arctan(2*f/Aperture size)=Angular Width.

In some examples, which may be combined with each of the examples described above, the convex cylindrical mirror type reflectarray has a quadratic phase determined by a phase profile as follows:

$$\varphi_{focus}(x) = \frac{2\pi}{\lambda_0} \times \left(f - \sqrt{x^2 + f^2}\right)$$

wherein f is a focal length.

In some examples, which may be combined with each of the examples described above, the method may also include determining a phase offset by the selection of the metasurface to reduce the ripples in the far field angular response, wherein the phase offset is added to the quadratic phase profile.

In some examples, which may be combined with each of the examples described above, the method may include selecting the aperture size for an Echelle grating type reflectarray, wherein the Echelle grating type reflectarray has a linear phase gradient.

In some examples, which may be combined with each of the examples described above, the wave simulations include S-polarization and P-polarization simulations including higher-order resonances at the plurality of angle of incidence.

In another aspect, a method of redirecting a radio frequency signal comprises using the reflectarray to deflect an RF signal from a transmitter toward a receiver.

In some examples, which may be combined with each of the examples described above, the RF signal is used for communications.

In some examples, which may be combined with each of the examples described above, the method may include further using the reflectarray to broaden the RF signal from the transmitter toward the receiver.

In another aspect, a method of constructing a reflectarray includes selecting a thickness of an optically transparent substrate to shift a resonance of the substrate beyond a fundamental resonance at a design frequency of a metasurface comprising an array of resonant patches. Thereafter, the metasurface is disposed over the optically transparent substrate. An optically transparent ground plane comprising a second optically transparent conductor is then disposed under the optically transparent substrate.

In some examples, which may be combined with each of the examples described above, the reflectarray includes a plurality of unit cells. Each unit cell includes one resonant patch, a portion of the optically transparent substrate, and a portion of the ground plane.

In another aspect, a method of constructing the reflectarray is provided. The reflectarray includes a plurality of unit cells, each unit cell comprising one resonant patch. The method includes selecting a thickness of the optically transparent substrate to shift a resonance of the substrate beyond a fundamental resonance at a design frequency of the metasurface comprising the array of resonant patches, disposing the metasurface over the optically transparent substrate, and disposing the optically transparent ground plane under the optically transparent substrate.

In a further aspect, a method is provided for constructing the reflectarray. The reflectarray includes a plurality of unit cells, each unit cell comprising one resonant patch. The method may include designing the reflectarray by selecting a thickness of the optically transparent substrate having an interference resonance that is away from a fundamental resonance at the design frequency of the metasurface, calculating starting dimensions for a patch of the array of resonant patches based on a dielectric constant of the optically transparent substrate and the design frequency, generating a computation model that performs wave simulations at a plurality of angles of incidence using the starting dimensions, and analyzing higher-order resonances of the patch obtained from the wave simulations while adjusting a size of the unit cells of the reflectarray in the wave simulations until an adjusted unit cell size is found for which the higher-order resonances are away from the design frequency and which do not interfere with the fundamental resonance at the design frequency at one of the plurality of angles of incidence. The method also includes selecting a thickness of an optically transparent substrate to shift a resonance of the substrate beyond a fundamental resonance at a design frequency of a metasurface comprising an array of resonant patches, disposing the metasurface over the optically transparent substrate, and disposing an optically transparent ground plane comprising a second optically transparent conductor under the optically transparent substrate.

Further details and embodiments and methods and techniques are described in the detailed description below. This summary does not purport to define the invention. The invention is defined by the claims.

DESCRIPTION OF THE DRAWINGS

The accompanying drawings, where like numerals indicate like components, illustrate embodiments of the invention.

DETAILED DESCRIPTION

Terms

Figure 1A:
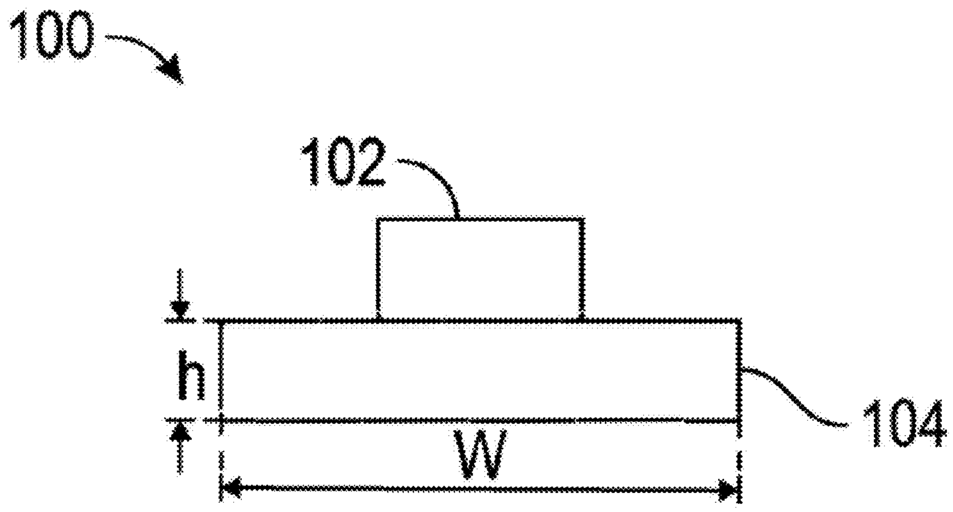
FIG. 1A is a schematic representation of a side view of an exemplary copper patch antenna according to an embodiment of the disclosure.

Unless defined otherwise, all technical and scientific terms used herein have the same meaning as commonly understood by one of ordinary skill in the art of radio frequency reflectarray devices to which this disclosure belongs. The initial definition provided for a group or term herein applies to that group or term throughout the present specification individually or as part of another group unless otherwise indicated.

To explain the invention well-known features of metasurfaces known to those skilled in the art of metasurfaces have been omitted or simplified in order not to obscure the basic principles of the invention. Parts of the following description will be presented using terminology commonly employed by those skilled in the art of metasurfaces. It should also be noted that in the following description of the invention repeated usage of the phrase "in one embodiment" does not refer to the same embodiment.

As used herein, the articles "a" and "an" refer to one or more than one (i.e., to at least one) of the grammatical object of the article. By way of example, "an element" means one element or more than one element. Furthermore, the use of the term "including" as well as other forms, such as "include," "includes," and "included," is not limiting. As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, including ±5%, ±1%, and ±0.1% from the specified value, as such variations are appropriate to perform the disclosed methods.

"Metamaterials" are a type of artificially structured material that includes subwavelength elements. Subwavelength elements can include structural elements with portions having spatial length scales smaller than an operating wavelength of the metamaterial. Further, the subwavelength elements have a collective response to waves or radiation that corresponds to an effective continuous medium response. For example, in the case of electromagnetic metamaterials, the collective response may be characterized by an effective permittivity, an effective permeability, an effective magnetoelectric coefficient, or any combination thereof. For example, electromagnetic radiation may induce charges and/or currents in the subwavelength elements, and the subwavelength elements can acquire nonzero electric and/or magnetic dipole moments. Some metamaterials provide an artificial magnetic response. For example, split-ring resonators (SRRs) and other plasmonic resonators can exhibit an effective magnetic permeability. Some metamaterials have "hybrid" electromagnetic properties that emerge partially from the structural characteristics of the metamaterial, and partially from the intrinsic properties of the constituent materials. For example, a metamaterial consisting of a wire array embedded in a nonconducting ferrimagnetic host medium can exhibit the effects of both the wire array and the host medium.

Metamaterials can be designed and fabricated to exhibit selected permittivity, permeability, and/or magnetoelectric coefficients values that depend upon material properties of the constituent materials as well as shapes, chirality, configurations, positions, orientations, and couplings between the subwavelength elements. The selected permittivity, permeabilities, and/or magnetoelectric coefficients values can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to visible wavelengths and beyond.

Metamaterials can include either or both discrete elements or structures and non-discrete elements or structures. For example, a metamaterial may include discrete structures, such as split-ring resonators. In another example, a metamaterial may include non-discrete elements that are inclusions, exclusions, layers, or other variations along some continuous structure.

Further, metamaterials can include extended structures having distributed electromagnetic responses, such as distributed inductive responses, distributed capacitive responses, and distributed inductive-capacitive responses. For example, metamaterials can include structures consisting of loaded and/or interconnected transmission lines, artificial ground plane structures, and/or interconnected/extended nanostructures.

A "metasurface" is a thin layer of a metamaterial. A thin layer of a metamaterial can include a subset of the total volume of the metamaterial. A metasurface can be approximated as an infinitely thin sheet having a surface impedance, or surface impedances for anisotropic responses. When approximated as an infinitely thin sheet the metasurface can lack a refractive index, as waves do not propagate or refract "inside" of the metasurface. Instead, the metasurface can act as a discontinuity in space.

A "Rolling Mask Lithography (RML) process" refers to a process by which large-area fabrication of two-dimensional metallic meshes of wires with sub-micron line widths, which is also referred to as nanowire mesh, which is optically transparent. The wire mesh or metallic mesh can have conductivity and transparency over alternative technologies and can be fabricated for large-area products and flexible devices of roll-to-roll fashion using RML or other lithographic printing technologies, e.g. photolithography, nanomprint lithography etc. The roll-to-roll lithography process allows for patterning the wire mesh with the mesh design for the target application transparency, haze, and/or electrical specifications. The wire mesh is also referred to as wire metallic mesh in the disclosure.

"Nanomesh" or "nanowire mesh" as used here encompasses an inorganic, nanostructured, two-dimensional material.

A "reflector" is a device that reflects light or other radiation.

An "efficiency" for a reflector is the percentage of the incident wave being reflected.

A "cylindrical mirror" has cylindrically shaped surfaces. The cylindrical mirror differs from spherical mirrors by focusing a beam on a focal line rather than a focal point. The cylindrical mirror can produce images that are flipped upside down and images that are not reversed.

A "beam deflector" is a device to deflect an incident collimated beam in a reflection mode.

A "beam dispersion or broadening device" is a device to broaden an incident collimated beam into a beam having an angular width in a reflection mode.

A "metalens" is a flat lens that uses a metasurface to focus or defocus light.

A "reflectarray" includes an array of unit cells, illuminated by a feeding antenna or a feeding element and a planar metasurface disposed over a substrate. The phase of the reflected field can be controlled and varied over the planar metasurface such that a reflected field can be obtained from the planar metasurface. The reflectarray also includes a ground plane under the substrate.

The "Dielectric constant ($\epsilon$)" is defined as the ratio of the electric permeability of the material to the electric permeability of free space (i.e., vacuum).

A "diffraction grating" is an optical component with a periodic structure that diffracts light into several beams traveling in different directions (i.e., different diffraction angles). The form of the light diffracted by the diffraction grating depends on the structure of the elements and the number of elements present, but all gratings have intensity maxima at angles θ which are given by the grating equation:

$$d(\sin\theta-\sin\theta_i)=n\lambda$$

where d is the separation of grating elements, λ is the free-space wavelength, $\theta_i$ is the incidence angle, and n is an integer called diffraction order.

An "Echelle grating" is a type of diffraction grating characterized by a relatively low groove density, but a groove shape that is optimized for use at high incidence angles and therefore in high diffraction orders. Higher diffraction orders allow for increased dispersion (spacing) of spectral features at the detector, enabling increased differentiation of these features.

A "patch antenna" is an antenna with a low profile, which can be mounted on a surface. The patch antenna includes a planar rectangular, circular, triangular, or any geometrical sheet or "patch" of metal, mounted over a larger sheet of metal called a ground plane. The patch of metal can be resonant.

A "resonant patch" has a unit cell dimension less than or equal to half the wavelength of the electromagnetic wave at the design frequency.

"P-polarization" and "S-polarization" are two orthogonal linear polarization states, which can be used for reflection and transmission. P-polarization has an electric field polarized parallel to the plane of incidence, while S-polarization is perpendicular to this plane of incidence. An electromagnetic wave (e.g., light) has an electric field oscillating perpendicularly to the direction of propagation. The electromagnetic field can be linearly polarized, i.e., the electric field of light is confined to a single plane along the direction of propagation. Depending on how the electric field is oriented, the polarized light into P-polarization and S-polarization.

DESCRIPTION OF EMBODIMENTS

Reference will now be made to specific examples illustrating the disclosure. It is to be understood that the examples are provided to illustrate exemplary embodiments and that no limitation to the scope of the disclosure is intended thereby.

The present disclosure provides an optically transparent reflectarray and methods of designing, constructing, and using the same.

The reflectarray includes an optically transparent substrate and optically transparent conductive meshes that form both the ground plane and the metasurface including an array of resonant patches. Each resonant patch includes an optically transparent conductor. Each resonant patch, together with a portion of the optically transparent substrate and a portion of the ground plane, forms a unit cell. In some variations, the optically transparent substrate includes glass or a polymer, such as, but not limited to poly(methyl methacrylate) (PMMA), polyethylene terephthalate (PET), polyimide, polyamide, and/or polycarbonate.

The metasurface using resonant patches of subwavelength sizes on a ground plane is provided herein. Using resonant patches of squares, rectangular shapes, circular shapes, and ring shapes among others, beam broadening devices or beam spreaders with an efficiency of about 95% have been constructed. These beam spreaders are insensitive to the angle of incidence and polarization and also have weak dependence of properties to a design frequency.

In one embodiment, a transparent silver mesh can be used in the reflectors. For a transparent silver mesh, if the sheet resistance is about 1 Ohm/sq, high efficiency of between about 50% to about 95% can be achieved. If the sheet resistance is higher, e.g., about 20 Ohm/sq. the reflectors become highly absorbing. Thus, high conductivity optically transparent meshes can be useful for optically transparent RF reflectors.

It will be appreciated by those skilled in the art that the transparent silver mesh may be replaced by other transparent conductors. The transparent metallic mesh, such as a silver mesh or transparent conductor is also referred to as metasurface in the disclosure.

In some variations, the sheet resistance of the metasurface is equal to or less than about 50 ohms/sq. In some variations, the sheet resistance of the metasurface is equal to or less than about 40 Ohm/sq. In some variations, the sheet resistance of the metasurface is equal to or less than about 30 Ohm/sq. In some variations, the sheet resistance of the metasurface is equal to or less than about 20 Ohm/sq. In some variations, the sheet resistance of the metasurface is equal to or less than about 15 Ohm/sq. In some variations, the sheet resistance of the metasurface is equal to or less than about 10 Ohm/sq. In some variations, the sheet resistance of the metasurface is equal to or less than about 5 Ohm/sq. In some variations, the sheet resistance of the metasurface is equal to or less than about 3 Ohm/sq. In some variations, the sheet resistance of the metasurface is equal to or less than about 1 Ohm/sq.

[1] In some variations, the metasurface composed of a metallic mesh, e.g., but not limited to a metallic nanowire mesh. An example of the metallic mesh includes Nanoweb®. The metallic mesh includes wires having a width in a range from about 0.6 μm to about 20 μm (e.g., but not limited to about 0.6 μm to about 1.5 μm, about 1 μm to about 5 μm, about 2.5 μm to about 5 μm, about 2.5 μm to about 10 μm, or about 5 μm to about 20 μm).

In some variations, the efficiency of the optically transparent RF reflector may be equal to or greater than about 80%. In some variations, the efficiency of the optically transparent RF reflector may be equal to or greater than about 85%. In some variations, the efficiency of the optically transparent RF reflector may be equal to or greater than about 90%. In some variations, the efficiency of the optically transparent RF reflector may be equal to or greater than about 95%.

In some variations, the RF reflector or reflectarray may have an optical transmittance of equal to or greater than 80% in the wavelength range from about 365 nm to about 850 nm. In some variations, the RF reflector or reflectarray may have an optical transmittance of equal to or greater than 85% in the wavelength range from about 365 nm to about 850 nm. In some variations, the RF reflector or reflectarray may have an optical transmittance of equal to or greater than 90% in the wavelength range from about 365 nm to about 850 nm. In some variations, the RF reflector or reflectarray may have an optical transmittance of equal to or greater than 95% in the wavelength range from about 365 nm to about 850 nm.

Figure 1B:
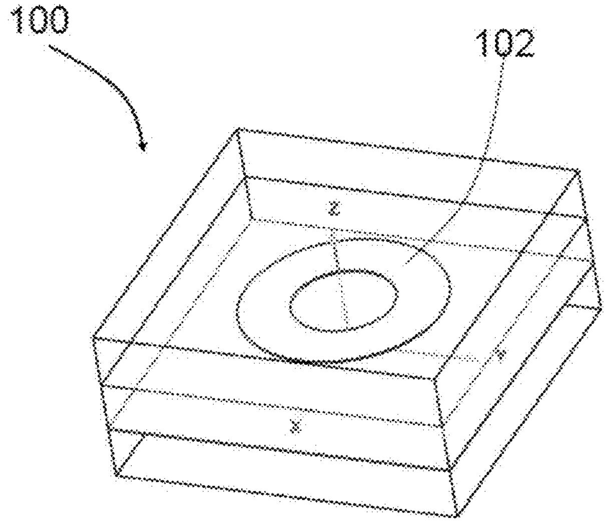
FIG. 1B is a schematic representation of a perspective view of an exemplary copper patch antenna according to an embodiment of the disclosure.

A side view and a perspective view of an exemplary copper patch antenna are depicted in FIG. 1A and FIG. 1B, respectively. As shown in FIG. 1B, an exemplary patch antenna 100 includes a ring-shaped patch 102 (e.g., copper) over a substrate 104 (e.g., FR4), which has a resonant behavior and phase as shown in FIG. 1C and FIG. 1D.

Figure 1C:
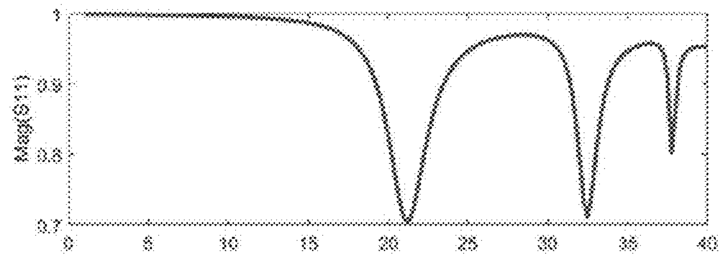
FIG. 1C is a schematic presentation of a plot of the magnitude of the reflection coefficient S11 of the exemplary copper patch antenna of FIG. 1A, the patch having a small absorption enabling its use as a building block for RF metasurfaces according to an embodiment of the disclosure.
Figure 1D:
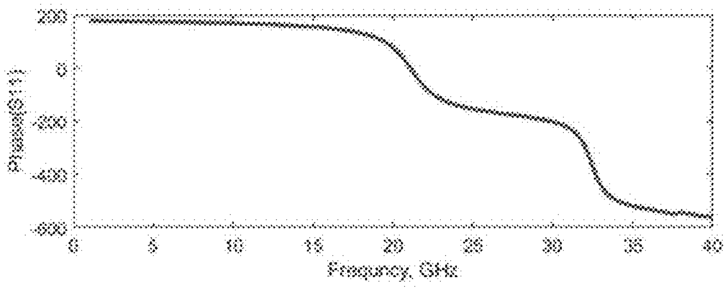
FIG. 1D is a plot of the phase of the reflection coefficient S11 of the exemplary copper patch antenna of FIG. 1A, the patch having a small absorption enabling its use as a building block for RF metasurfaces according to an embodiment of the disclosure.

For an exemplary ring-shaped patch of about 2.9 mm outer diameter and 1.45 mm inner diameter and a unit cell of about 5 mm by about 5 mm, the resonant behavior and phase as a function of frequency are illustrated in FIG. 1C and FIG. 1D, respectively. As delineated in FIG. 1C, the magnitude of S11 ranges from about 0.7 to about 1.0 along a vertical axis, while the horizontal axis is the frequency ranging from about 0 GHz to about 40 GHz. The phases ranging from about −200° to about 200° are shown along a vertical axis while the frequency ranges from about 0 GHz to about 40 GHz are shown along the horizontal axis in FIG. 1D. The exemplary patch antenna 100 shown in FIG. 1C has a small absorption and a reflection of greater than about 90% while allowing control over the reflection phase in the range of about −180° to about 180°, which enables its use as a building block for RF metasurfaces.

A side view and a perspective view of an exemplary copper patch antenna are depicted in FIG. 1A and FIG. 1B, respectively. As shown, an exemplary patch antenna 100 includes a ring-shaped patch 102 (e.g., copper) over a substrate 104 (e.g., FR4), which has a resonant behavior and phase as shown in FIG. 1C and FIG. 1D.

Figure 2A:
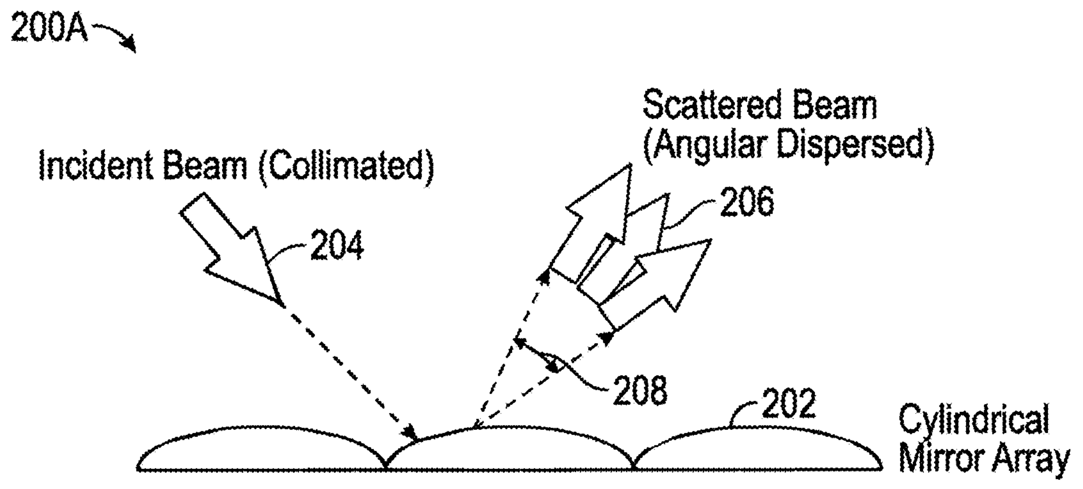
FIG. 2A is a diagrammatic representation of a collimated beam dispersed into angles using a parabolic cylindrical mirror array according to an embodiment of the disclosure.

A collimated beam dispersed into angles using a parabolic cylindrical mirror array according to an embodiment of the disclosure is depicted in FIG. 2A. As illustrated in FIG. 2A, a geometric optical analog 200A includes an array of cylindrical mirrors 202. A collimated beam 204 incident over the array of cylindrical mirrors 202 is reflected as a beam 206 having an angular width 208. The geometric optical analog 200A, as shown in FIG. 2A, is used to implement the metasurface for beam dispersion or broadening along one axis, such as a horizontal axis x.

Figure 2B:
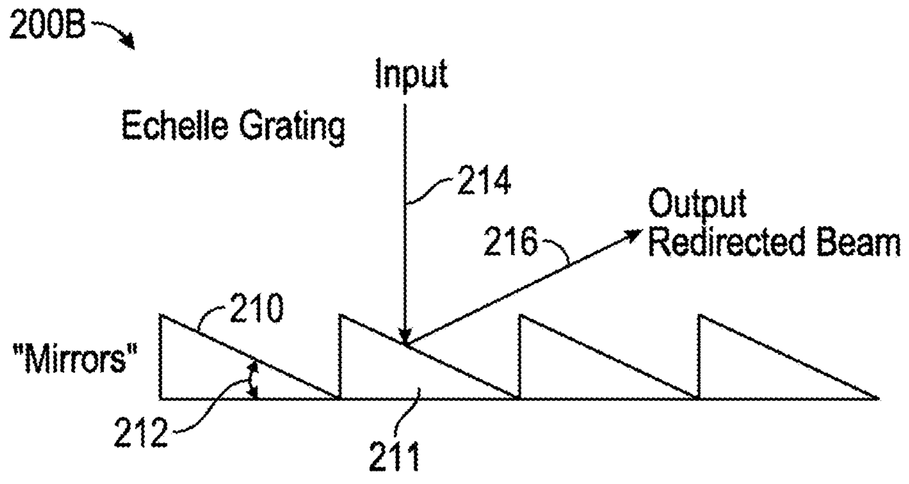
FIG. 2B is a diagrammatic representation of an Echelle grating with a chosen blazing angle that can be used as an efficient beam deflector according to an embodiment of the disclosure.

An Echelle grating with a blazing angle that can be used as an efficient beam deflector according to an embodiment of the disclosure is depicted in FIG. 2B. As illustrated in FIG. 2B, a geometric optical analog 200B includes an Echelle grating, which has a blazing angle 212 and a slope 210 to a horizontal surface 211. An input beam 214 is incident onto the Echelle grating from a normal direction to the surface 211 and is deflected as an output redirected beam 216. The geometric optical analog 200B, as shown in FIG. 2B, is used to implement the metasurface for beam deflection.

In some variations, the Echelle grating has an aperture size of about 3 $\lambda_{0\ 0}$ to about 30 $\lambda_{0\ 0}$ and a blazing angle of about 1° to about 40°.

In some variations, combinations of metasurfaces for beam deflection and beam dispersion can be used to disperse and redirect the beam.

Figure 3A:
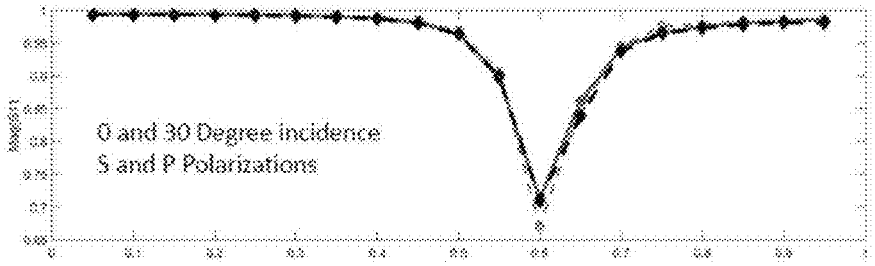
FIG. 3A is a schematic representation of the amplitude of an exemplary ring-shaped patch according to an embodiment of the disclosure.

The patch arrays have a phase independent of polarization and an amplitude response insensitive to the angle of incidence. The reflection phase of an exemplary ring-shaped patch calculated using a unit cell having a size of about 5 mm and a glass substrate of about 0.7 mm thick as a function of ring diameter (which is a fraction of unit cell size) is depicted in FIG. 3A. A vertical axis represents the magnitude of wave S11 or microwave reflection coefficient from the surface, which ranges from 0.8 to 1.0. A horizontal axis represents the ring diameter fraction, which ranges from 0 to 1.0 at an increment of 0.05. The S-polarization (solid lines) and P-polarization (dashed lines) are plotted versus ring diameter fraction at about 0° and about 30° of the angle of incidence, which shows insensitivity to both polarization and angles of incidence. The magnitude of wave S11 relates to the efficiency of the patch array or reflectarray and is 70% or higher.

The thickness of the substrate determines the thin film resonances when a substrate with finite loss is used. The reflection of a thin film above a ground plane is calculated by the following formulas:

Surface impedance *Zin*=sqrt(*mur*/*er*)*tanh(sqrt(−1)*2pi/hsqrt(*mur***er*)/*c*)

Return Loss (RL)=20*log 10(abs((*Zin*−1)./(*Zin*+1)))

Reflection phase (Phase)=angle((*Zin*−1)./(*Zin*+1))

where h represents the thickness of the substrate, "f" represents the frequency, "abs" represents absolute value, "sqrt" represents square root, "mur" represents relative magnetic permeability, and "er" represents relative dielectric constant, both "mur" and "er" are complex numbers.

The patch may be a rectangular shape with a width of W and a length of L. The width of the patch relates to a design frequency $f_r$ and dielectric constant $\varepsilon_r$ of the substrate by using Eq. (1) as follows:

$$W = \frac{C_0}{2f_r}\sqrt{\frac{2}{\varepsilon_r + 1}} \qquad \text{Eq. (1)}$$

W=Width of the patch
$C_0$=Speed of light
$\varepsilon_r$=value of the dielectric substrate An effective refractive index value εreff of a patch is a useful parameter in the designing procedure of the patch antenna 100. The radiations traveling from the patch towards the ground pass through the air and some through the substrate (called fringing). Both the air and the substrates have different dielectric values. Thus, to account for the fringing, the value of the effective dielectric constant is calculated using Eq. (2) as follows:

$$\varepsilon_{reff} = \frac{\varepsilon_r + 1}{2} + \frac{\varepsilon_r - 1}{2}\left[1 + 12\frac{h}{W}\right]^{-1/2},\ W/h > 1 \qquad \text{Eq. (2)}$$

Due to the fringing, electrically the size of the antenna is increased by an amount of (ΔL). Therefore, the actual increase in length (ΔL) of the patch is to be calculated using Eq. (3) as follows:

$$\frac{\Delta L}{h} = 0.412\frac{(\varepsilon_{reff} + 0.3)\left(\frac{W}{h} + 0.264\right)}{(\varepsilon_{reff} - 0.258)\left(\frac{W}{h} + 0.8\right)} \qquad \text{Eq. (3)}$$

where h is the height of the substrate.

The length (L) of the patch is now to be calculated using Eq. (4) as follows:

$$L = \frac{C_0}{2f_r\sqrt{\varepsilon_{reff}}} - 2\Delta L \qquad \text{Eq. (4)}$$

Figure 3B:
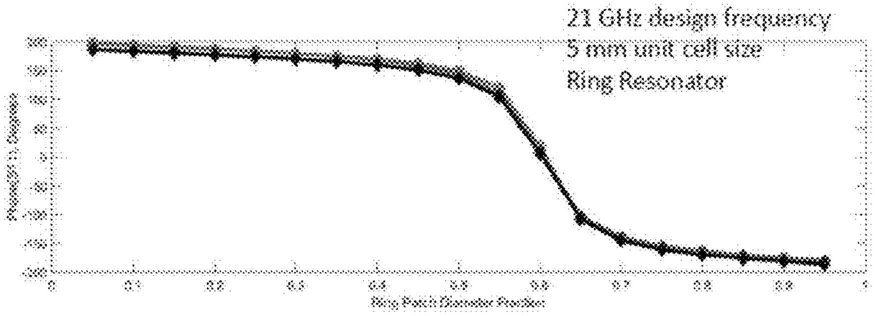
FIG. 3B is a schematic representation of the reflection phase of an exemplary ring-shaped patch according to an embodiment of the disclosure.

The reflection phase of a ring-shaped patch calculated using a unit cell size of about 5 mm and a glass substrate of about 0.7 mm thick is depicted in FIG. 3B as a function of ring diameter fraction (which is a fraction of unit cell size) according to an embodiment of the disclosure.

As shown in FIG. 3B, a vertical axis represents phase and ranges from −200° to 200°. This phase plot is obtained for a design frequency of 21 GHz. This illustrates that the phase may vary with the ring patch diameter or fraction. When the patch diameter is small so that the resonance of the patch is above the design frequency of 21 GHz, the phase is positive. The unit cell size and other parameters are chosen typically such that the resonance matches the design frequency when the patch size is about half the size of the unit cell. Therefore, small refers to patch sizes smaller than one half of the unit cell size. When the patch diameter is large, i.e., larger than half of the unit cell size, the phase is negative. The overall phase can vary from 0° to about 360°. Note that the phase is insensitive to polarization (solid lines show S-Polarization, dash-dot lines show P-Polarization, dashed lines guide for the eye) and angles of incidences.

When the unit cell size becomes smaller, the available phase range decreases. On the other hand, when the unit cell size increases, higher-order modes begin to interfere with the fundamental resonance and complicate the design. For an isolated fundamental resonance, the periodicity can be properly selected based on computational results. For example, for a glass substrate of about 0.7 mm thick and a design frequency of about 21 GHz, a unit cell size of about 5 mm to about 5.5 mm may be selected.

In some variations, the size of the unit cell may be selected based on the design frequency and the thickness of the substrate by using full-wave computations. When the dimensions of a square patch are known, the length and width of a substrate are equal to that of the ground plane. The length of a ground plane (Lg) and the width of a ground plane (Wg) are calculated using Eq. (5) and Eq. (6) as follows:

$$Lg=6h+L \quad \text{Eq. (5)}$$

$$Wg=6h+W \quad \text{Eq. (6)}$$

In some variations, a phase profile for a metalens or metasurface, the convex cylindrical mirror type, is given by Eq. (7) as follows:

$$\varphi_{focus}(x) = \frac{2\pi}{\lambda_0} \times \left(f - \sqrt{x^2 + f^2}\right) \quad \text{Eq. (7)}$$

where f is the focal length, $\lambda_{0\,0}$ is the free-space wavelength, and x is the position on a horizontal axis.

The ratio of the focal length to aperture size or width of the lens determines the angular width of a reflected collimated beam by Eq. (8) as follows:

Arctan(2*f/Aperture size)=Angular Width Eq. (8)

The design parameters, such as the focal length and/or the aperture size can be selected to reduce grating lobes. For example, choosing an aperture size of about 10 wavelengths $\lambda_{0\,0}$ or larger can reduce the diffraction to higher-order grating orders and thus can produce a response close to that of a geometric optic component, such as the convex cylindrical mirror, where the wavelength $\lambda_{0\,0}$ is a free space wavelength corresponding to the design frequency. Making the aperture size of the metalens or metasurface smaller may result in grating lobes.

In some variations, a convex cylindrical mirror array of an aperture size from about 3 $\lambda_{0\,0}$ to about 100 $\lambda_{0\,0}$ and a focal length of about 3 $\lambda_{0\,0}$ to about −200 $\lambda_{0\,0}$.

In some variations, a linear phase gradient is used to implement a metasurface, e.g., the Echelle grating type, which is used as a beam deflector. The slope of the linear phase gradient determines the angular deflection that can be achieved using the metasurface.

An exemplary implementation of patch arrays for a convex cylindrical mirror type includes a patch array in a circular shape which has a slow periodicity variation along a vertical axis y, which is introduced to smear out the angular width of zeroth order scattering from the surfaces, thus providing a smooth angular distribution. The period of the variation along the vertical axis y is selected to be large enough to avoid scattering to higher-order modes along the vertical axis y. The phases can be calculated as a function of horizontal x position using Eq. (4) and are then mapped into the range of about 180° to about −180° using modular arithmetic. The periodicity variation of the patch along the horizontal axis is selected to be less than half the wavelength $\lambda_{0\,0}$ corresponding to the design frequency to maintain effective medium properties and eliminate diffraction orders due to grating scattering. The patch size can be selected using the computational results from FIGS. 3A-3B as a look-up table. The look-up table lists a phase value and the magnitude or efficiency of the reflector for a given patch size or patch width.

An exemplary implementation of patch arrays for an Echelle grating type includes a patch array in a square shape which has a slow periodicity variation along a vertical axis y. The slow variation along the y-axis eliminates interference effects between waves coming from different rows of patches and provides a smooth far-field scattering pattern. The phase has a linear gradient.

Figure 4:
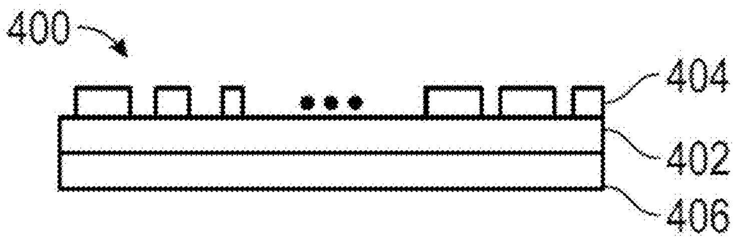
FIG. 4 is a schematic representation of the cross-sectional view of the beam broadening device or the beam deflector according to an embodiment of the disclosure.

A cross-sectional view of the beam broadening device or the beam deflector is depicted in FIG. 4 according to an embodiment of the disclosure. As shown, a reflectarray 400 includes a patch array 404 disposed over an optically transparent substrate 402, such as a glass substrate. The substrate 402 is disposed over a ground plane 406. Both patch 404 and the ground plane 406 may be formed of an optically transparent and highly conductive mesh or metamaterial.

For general beam forming and redirection, Echelle grating type linear phase gradients can be combined with convex cylindrical mirror type quadratic phase gradients, and both beam redirection and broadening can be achieved in a single metasurface.

Examples of transparent conductors include, but are not limited to, indium tin oxide (ITO), nanoparticle-doped silica, metallic mesh, and nanowire mesh, e.g., Nanoweb®, which may be manufactured using the RML. These thin layers act separately as metasurfaces or collectively as metamaterial to provide corrections to the phase of the wavefront being transmitted through the structure.

Figure 5:
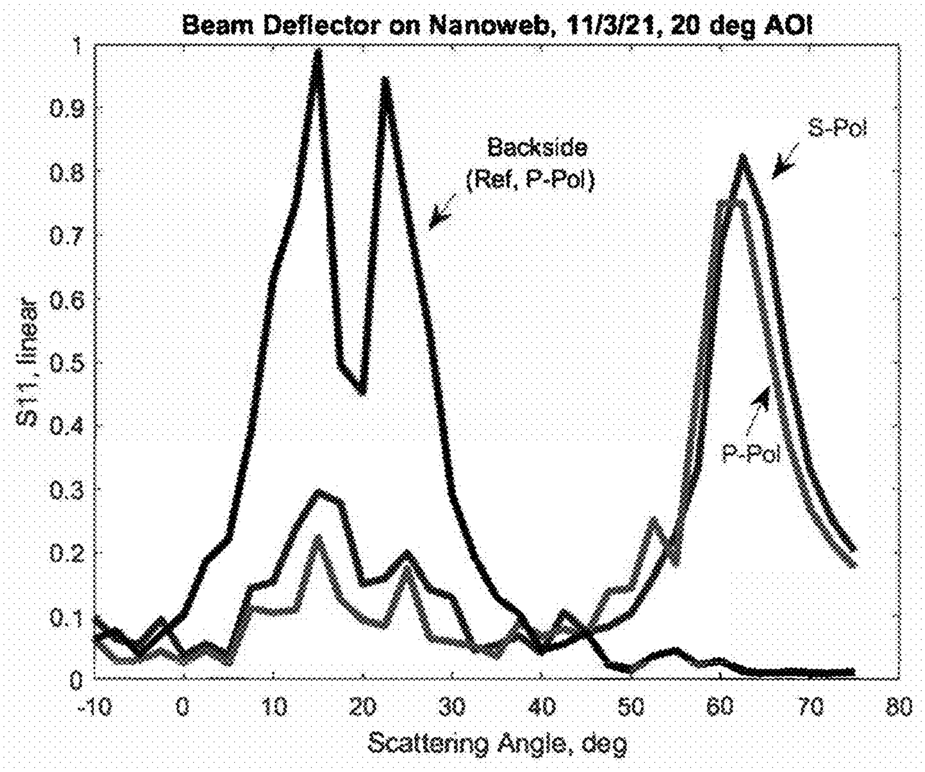
FIG. 5 is a graphic representation showing the reflection measured as a function of scattering angle for a given incidence angle of about 20° using the Echelle grating type beam deflector according to an embodiment of the disclosure.

The reflection as a function of scattering angle for a given incidence angle of about 20° using the Echelle grating type beam deflector is depicted in FIG. 5. The beam deflector, i.e., the Echelle grating type metasurface was fabricated on a glass of about 0.7 mm thick. The reflection was measured as a function of scattering angle for a given incidence angle of about 20° by using a Keysight Fieldfox Network Analyzer 9550B (Keysight Technologies of Santa Rose, CA). As shown in FIG. 5, the vertical axis represents the magnitude of S11, ranging from about 0 to about 1. The horizontal axis represents the scattering angle in degrees, ranging from about −10° to about 80°. Both P-polarization and S-polarization respond similarly, and about 35° beam deflection was achieved. In the backside reflection, interference effects at normal incidence cause measurement artifacts and split the response into two peaks. At about 20 degrees angle of incidence on the metasurface side (front), the scattered beam is deflected to about 65 degrees for both polarizations. The beam deflector can be updated for arbitrary angles of incidence and scattering. However, beyond about 70°, the patch responses are severely deviating from the normal incidence response, and the performance also degrades.

Figure 6A:
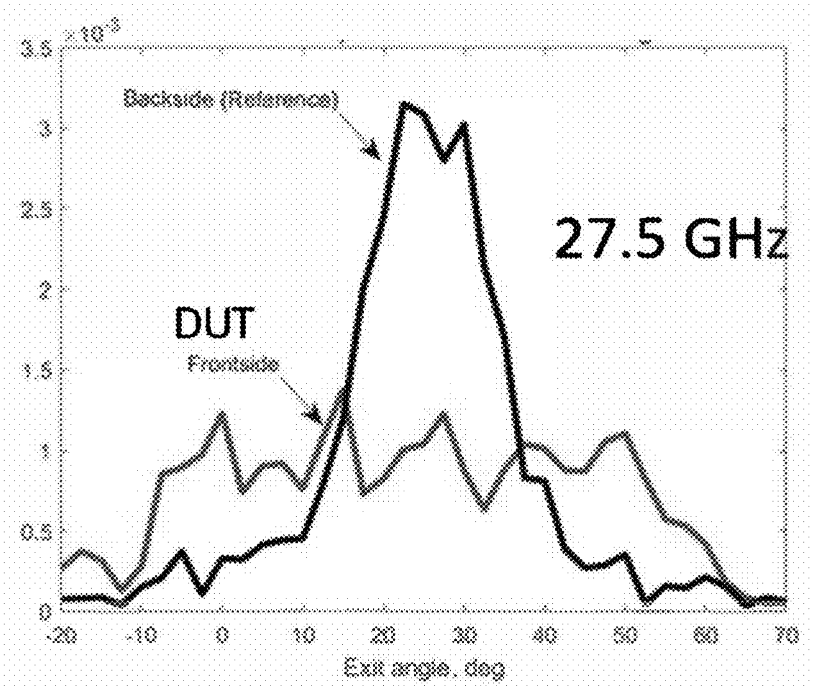
FIG. 6A is a graphic representation showing the far field pattern for the beam broadening device (cylindrical mirror) at about 27.5 GHz according to an embodiment of the disclosure.
Figure 6B:
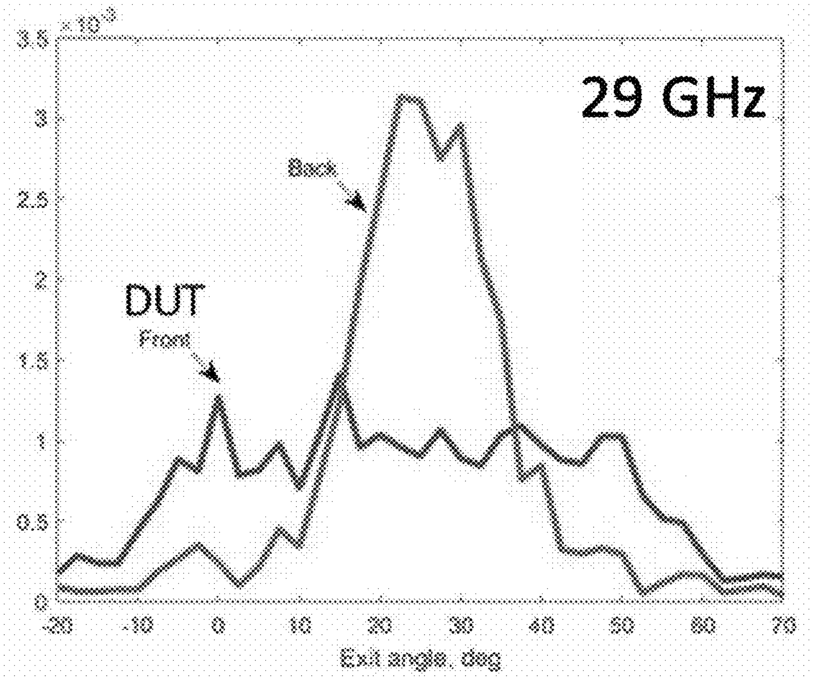
FIG. 6B is a graphic representation showing the far field pattern for the beam broadening device (cylindrical mirror) at about 29 GHz according to an embodiment of the disclosure.

A graphic representation showing the far field pattern for the beam broadening device (convex cylindrical mirror) at about 27.5 GHz is depicted in FIG. 6A. A graphic representation showing the far field pattern for beam broadening device (convex cylindrical mirror) at about 29.0 GHz is depicted in FIG. 6B. In both FIGS. 6A and 6B, the vertical axis represents the strength of scattering signal, i.e., magnitude of reflection, measured as S21 while the horizontal axis represents the exit angle in degrees. The exit angle is the scattering angle. The measured response from the cylindrical mirror type reflectarray is observed to be insensitive to polarization as predicted by the wave simulations. The bandwidth of the reflectarray is above about 1 GHz, which is insensitive to polarization.

Figure 6C:
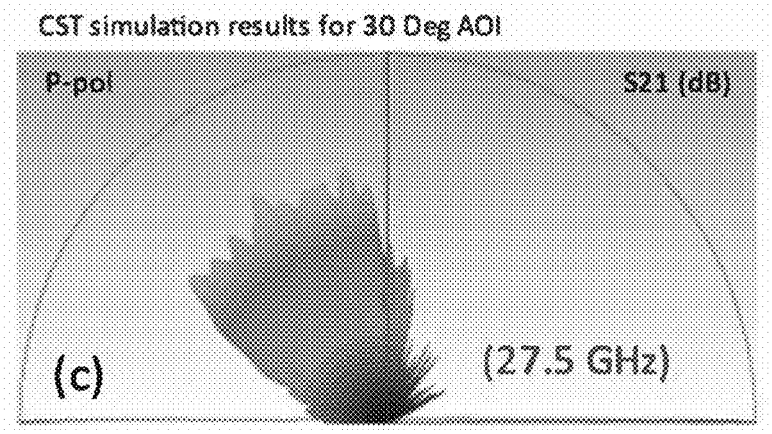
FIG. 6C is a graphic representation showing the polarization insensitive operation predicted by full-wave simulations for P-polarization and verified experimentally according to an embodiment of the disclosure.
Figure 6D:
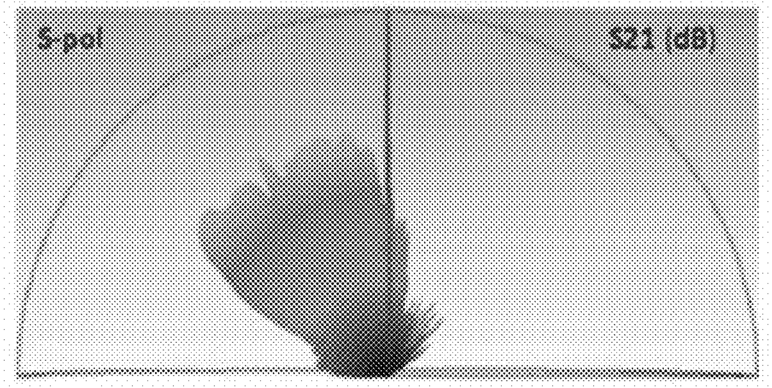
FIG. 6D is a graphic representation showing the polarization insensitive operation predicted by full-wave simulations for S-polarization and verified experimentally according to an embodiment of the disclosure.

A prediction by full-wave simulations for P-polarization according to an embodiment of the disclosure is depicted in FIG. 6C. A prediction by full-wave simulations for S-polarization is depicted in FIG. 6D. The beam broadening pattern in FIG. 6C for P-polarization looks similar to the beam broadening pattern in FIG. 6D S-polarization, As such, the beam broadening is insensitive to polarization. The full-wave simulations for both S-polarization and P-polarization are verified experimentally.

Design Algorithm

In a metal-dielectric-metal structure with a continuous ground plane, the thickness of the dielectric layer and loss of the dielectric material can cause a thin-film interference resonance. The dielectric constant and/or the thickness of the dielectric layer may be selected such that the thin-film resonances are farther away from the desired operation frequency, which allows for higher efficiency and improved phase control of the surface reflection at the design frequency of the metasurface or the design frequency of the patch of the metasurface.

When the dielectric layer (e.g., glass substrate) has a dielectric loss tangent, a Fabry-Perot type resonance is observed. The resonant frequency of the dielectric layer is dependent on the dielectric constant and thickness of the dielectric layer or glass substrate. The resonance of the dielectric layer has an associated phase response. When the resonance of the dielectric layer, which is also referred to as thin film resonance or interference resonance, is close to the design frequency of the metasurface, which is also referred to as the patch resonance, the phase is limited by the interaction of the patch resonance and thin film resonance. For example, when the dielectric constant of the glass is about 5.37 and the thickness of the glass is about 0.7 mm, the interference resonance is about 40 GHz, which is far from the design frequency of about 27.5 GHz for the patch resonance.

Figure 7:
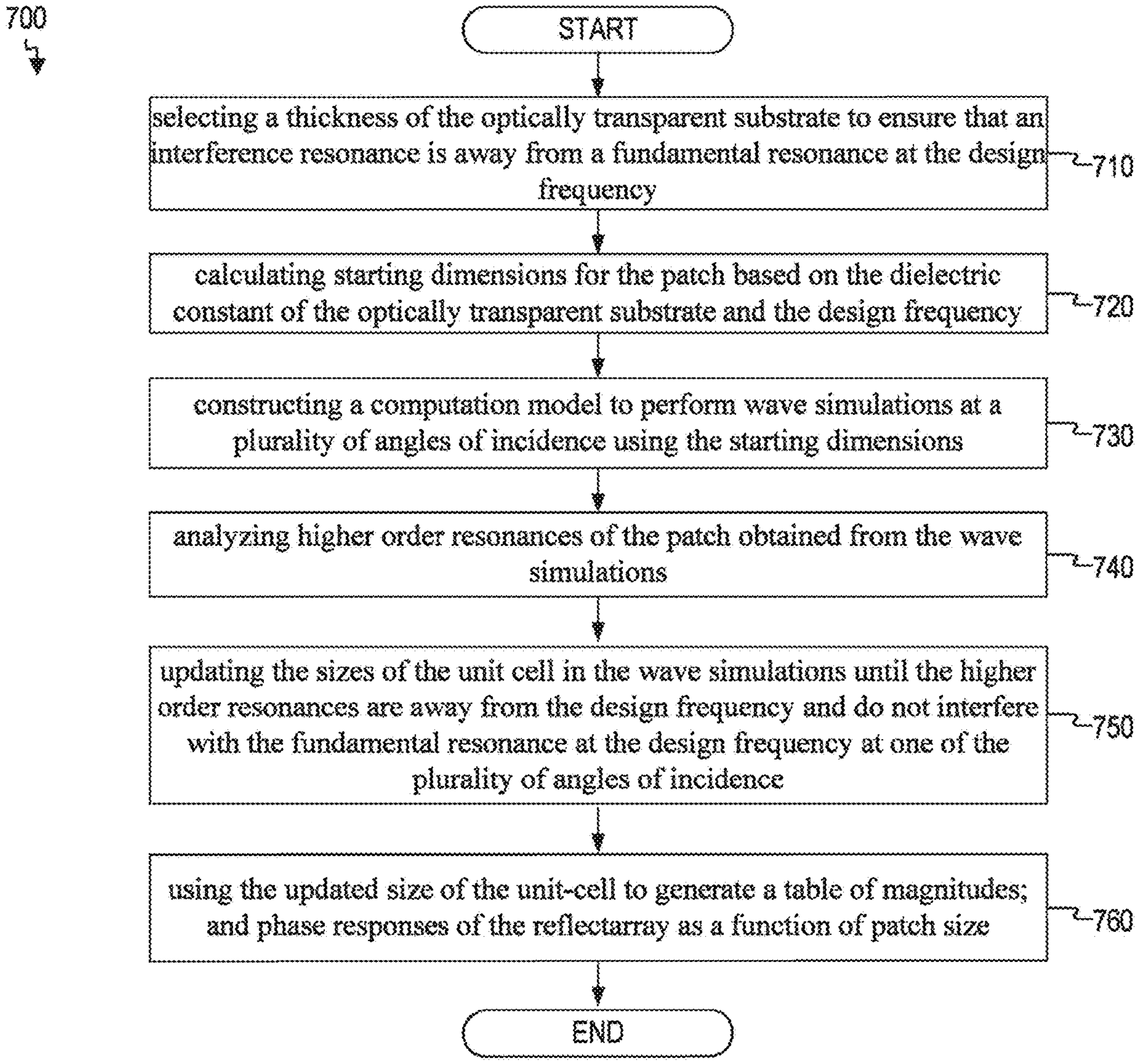
FIG. 7 is a flow chart illustrating the steps of a design algorithm for designing reflectarrays according to an embodiment of the disclosure.

A flow chart illustrating the steps of a design algorithm for designing reflectarrays according to an embodiment of the disclosure is depicted in FIG. 7. A design algorithm or method 700 may start with selecting the thickness of the optically transparent substrate to ensure that an interference resonance is away from a fundamental resonance at the design frequency at block 710, i.e., the thin film resonance is far away from the design frequency of the patch or the design frequency of the metasurface.

Then, the design algorithm 700 may include calculating a starting dimension for the patch based on the dielectric constant of the optically transparent substrate and the design frequency at block 720. For example, using Eq. (1) to Eq. (6) to get the starting dimensions, including the starting width and starting length of the patch, and the starting sizes of the unit cell.

The design algorithm 700 may also include constructing a computational model to perform full-wave simulations at various angles of incidence using the starting dimensions at block 730.

The design algorithm 700 may also include analyzing higher-order resonances of the patch obtained from the wave simulations at block 740. The response includes higher-order resonances of the patch array or reflectarray. The analysis evaluates higher-order resonances of the patch array or reflectarray to make sure that the higher-order resonances do not interfere with the fundamental resonance at the angles of interest.

The design algorithm 700 may also include updating or adjusting the unit cell size in the wave simulations until the higher-order resonances are away from the design frequency and do not interfere with the fundamental resonance at the design frequency at one of the plurality of angles of incidence at block 750.

The design algorithm 700 may also include using the updated size of the unit cell to generate a look-up table of magnitudes and phase responses of the patch array or the reflectarray as a function of patch size at block 760 (see Table 1 in the Example below).

The quadratic phase as a function of x-direction is calculated using Eq. (7). Additional corrections to the quadratic phase can be included, such as higher-order terms or skewness/asymmetry. A phase offset can be added as a design parameter to the calculated phase. The added phase offset has the benefit of reducing the ripples in the far field angular response, through the selection of high-efficiency sections and low-efficiency sections of the reflectarray. The phase as determined by Eq. (7) is used to calculate a corresponding phase in the range from about 180° to about −180° using modular arithmetic. The patch response data look-up table (e.g., Table 1 below) is then used to find the patch size as a function of x position, through a look-up algorithm and/or interpolation. The look-up algorithm works as follows: for a given position on the metasurface, a phase is calculated using the desired phase response function of the metasurface. The closest value to this phase value is then searched in the look-up table and corresponding patch size is found. The amplitude of the reflection coefficient is also found for this patch size and the full reflection coefficient is calculated based on amplitude and phase. The patch size is used in generating a layout for the lithography mask. The design is generated using a script and the layout is determined. An analytical summation of the reflection response of the metasurface is calculated and the phase offset may be adjusted to reduce the ripple in the far field response.

The designs of the reflectarray can be simulated using full-wave simulations at various angles of incidence and polarizations to verify the design. The full-wave simulations comprise S-polarization and P-polarization simulations including higher-order resonances at the plurality of angle of incidence. Then, the designs are fabricated and tested.

For a beam deflector, i.e., an Echelle Grating type, the quadratic phase profile in Eq. (4) is replaced by a linear phase gradient. Other steps are the same as for the beam broadening device.

Fabrication and Testing

The designs of the reflectarrays can be fabricated, for example, using photolithography on transparent conductive meshes. In photolithography, the transparent conductive mesh is coated with a photoresist, after which the reflectarray pattern is exposed into the resist. The photoresist is developed and metal mesh and then etched using a wet chemistry. Alternatively, the transparent mesh and reflectarray pattern can be exposed in a sequential exposure, using a negative photoresist. In this case, the mesh pattern is exposed first and before the development, a second exposure that patterns the reflectarray is done. Then, the substrate with a negative resist is developed and metallized. After metallization, a liftoff is performed to obtain the final reflectarray patterned transparent mesh.

Alternatively, the designs of the reflectarrays can be fabricated, for example, using laser ablation. Transparent conductive films of metallic mesh or transparent conductive oxides or dielectric-metal-dielectric coatings can be patterned using laser ablation process, which can be applied in a roll-to-roll fashion.

The reflectarrays include transparent conductive meshes or nanomeshes. Rolling mask lithography (RML) has been employed to define deterministic nanowire meshes on transparent substrates. Random nanowire meshes have been also used for making transparent conductors, for example by electrospinning a solution of silver (Ag) nanowires. However, such processes that start from finite length nanowires to form a mesh or nanomesh may suffer from discontinuous conduction paths and high conductivity meshes have not been achieved.

To achieve optical transparency and electrical conductivity, transparent conductive oxides (TCOs), such as indium tin oxide (ITO), zinc oxide (ZnO), and aluminum-doped zinc oxide (AZO), are traditionally used as coatings on dielectric substrates. Alternatively, random silver (Ag) nanowire meshes or carbon nanotube composite films may be used for radio frequency (RF) antennas that are transparent in the visible. The electrical conductivity can be measured by sheet resistance. The sheet resistance that can be achieved using such random nanowire meshes or TCOs may vary from about 20 Ohm/sq to about 100 Ohm/sq and for radio frequency of interest (about 5 GHz to about 30 GHz or 5G bands), resonant patch antennas have strong absorbing characteristics when the sheet resistance is in the range of about 20 Ohm/sq to about 100 Ohm/sq. Also, the reflection phase range used to implement an arbitrary metasurface of the reflectarray is about 0° to about 360°. The highly conductive resonant patch arrays can achieve from about 0 to about 360 degrees phase control with an efficiency of greater than about 80%, allowing implementation of arbitrary optically transparent RF reflectarrays with high efficiency.

In some variations, the metasurface comprises silver (Ag), indium tin oxide (ITO), or nanoparticle-doped silica.

In other variations, the metasurface comprises nanowire meshes made by one of electrospun fiber templates, crack lithography, or spinning layers of metallic nanowires.

The reflectarrays were tested using a homebuilt reflection setup. A network analyzer covering the about 1 GHz to about 50 GHz frequency range is connected to Horn antennas mounted on rotation stages, and the sample to be measured is placed at the rotation center. The sample is fixed and horn antennas are rotating while facing the sample surface. In such a way, arbitrary scattering configurations corresponding to different angles of incidence and scattering can be measured using the network analyzer. The high gain (25 dB) and directivity of the horn antennas, and the large distance between the horn antennas and sample allow approximating the input and output waves as plane waves.

The reflectarray may be constructed by starting with a library of unit cells that provide a desired reflection phase for the design frequency and angle of incidence. The size of the unit cells and the size of the structures (patches) in the unit cell determine the resonance frequency of the unit cell near the design frequency, thus determining the reflection phase. Using the library of unit cells with varying patch sizes, the spatially dependent reflection phase can be constructed, by sequentially placing unit cells of corresponding patch size for the desired reflection phase.

The benefits of the disclosed reflectarrays include, but are not limited to, low sensitivity to angle of incidence (AOI), polarization, or frequency of operation, and high efficiency. The benefits also include the design procedure or algorithm.

The disclosed reflectarrays can be used in many applications, including, but not limited to, beamforming in communications, and radar deflecting surfaces, among others.

Figure 8:
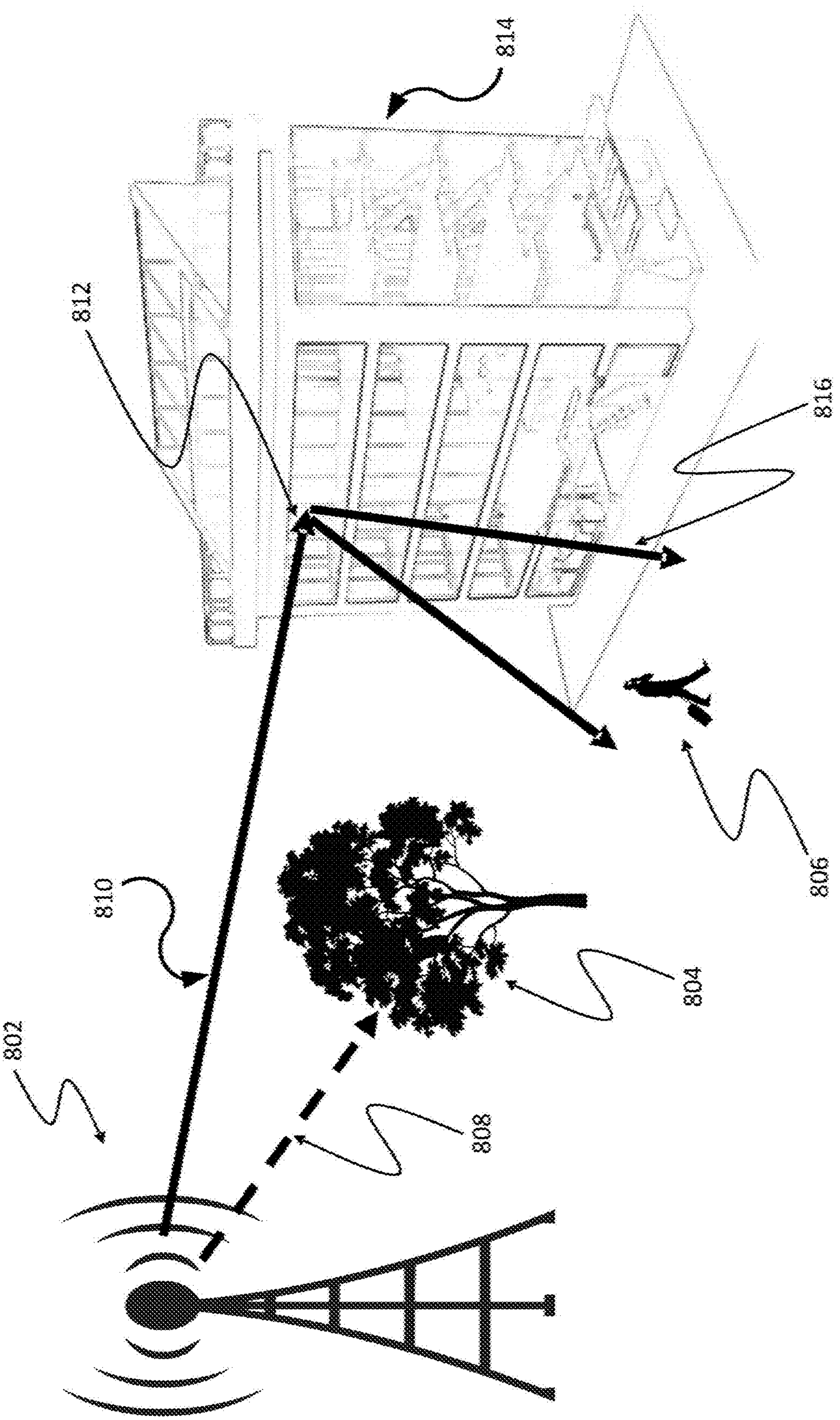
FIG. 8 is a schematic illustration of the example use case of a transparent reflectarray for rerouting a wireless transmission in an urban landscape according to an embodiment of the disclosure.

An application of a transparent reflectarray is the use of rerouting a wireless signal in the presence of obstacles. A transparent reflectarray for rerouting a wireless transmission in an urban landscape is depicted in FIG. 8 according to an embodiment of the disclosure. A transmitter 802, such as a cell phone tower, transmits signals. A signal or beam 808 is obstructed in the presence of obstruction 804, such as buildings or trees. A transparent reflectarray 812 can be positioned on the windows of building 814. In such a way, an unobstructed signal 810 from the transmitter 802 can be rerouted onto the street level and redirected to reach a receiver 806. The transparent reflectarray 812 can alleviate the need for a wireless repeater while being compatible with glass facades and windows of buildings.

Reference will now be made to specific examples illustrating the disclosure. It is to be understood that the examples are provided to illustrate exemplary embodiments and that no limitation to the scope of the disclosure is intended thereby.

EXAMPLES

The design algorithm described above and depicted in FIG. 7 was used to generate a look-up table) of magnitudes and phase responses of the patch array or the reflectarray as a function of patch size (at block 760 in FIG. 7). The data in Table 1 is for an angle of incidence of about 30 degrees, about 5 mm unit cell, and ring-shaped patch (ring width is half the ring radius) at a design frequency of about 21 GHz.

TABLE 1

| Patch Filling Fraction | Magnitude (S11) | Phase (degrees) |
|---|---|---|
| 0.05 | 0.994355198 | 195.2343751 |
| 0.1 | 0.994280988 | 192.4353685 |
| 0.15 | 0.994133654 | 189.5652219 |
| 0.2 | 0.993911087 | 186.4957774 |
| 0.25 | 0.993500869 | 183.1998301 |
| 0.3 | 0.992862279 | 179.5407212 |
| 0.35 | 0.99154399 | 175.2109582 |
| 0.4 | 0.989122272 | 169.8460922 |
| 0.45 | 0.983900202 | 162.1582197 |
| 0.5 | 0.968498766 | 149.1846206 |
| 0.55 | 0.906062047 | 120.7565273 |
| 0.6 | 0.671062228 | 19.22978993 |
| 0.65 | 0.851272006 | −108.8941999 |
| 0.7 | 0.945232849 | −144.4287592 |
| 0.75 | 0.97609628 | −156.0206842 |
| 0.8 | 0.978414839 | −166.6676983 |
| 0.85 | 0.982811983 | −172.4674712 |
| 0.9 | 0.985332084 | −177.1409448 |
| 0.95 | 0.986789245 | −181.2264803 |

Figure 9A:
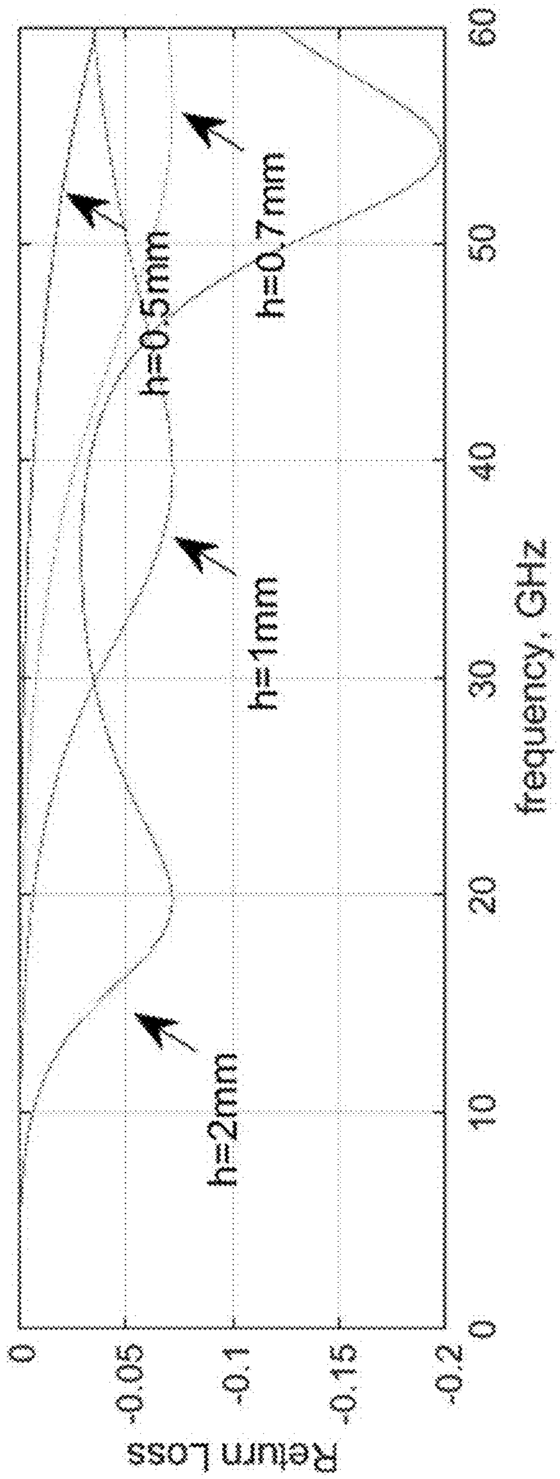
FIG. 9A is a graphic representation showing the return loss versus frequency for various thicknesses of a substrate according to an embodiment of the disclosure.
Figure 9B:
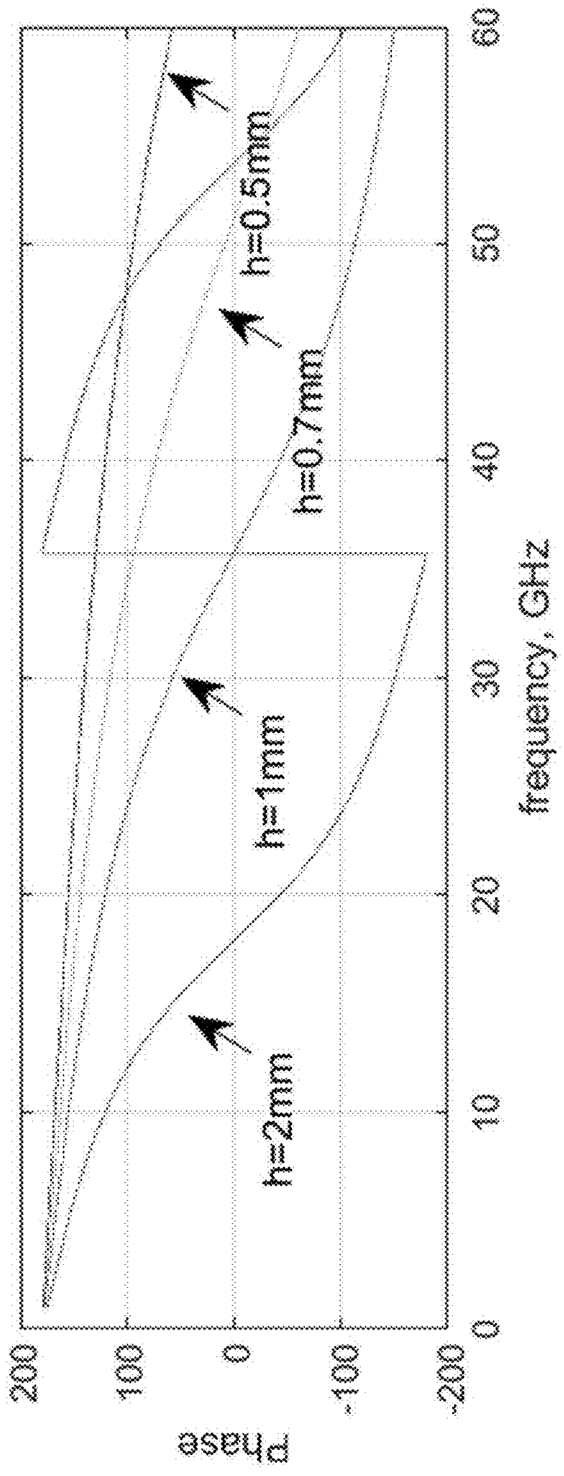
FIG. 9B is a graphic representation showing the phase versus frequency for various thicknesses of a substrate according to an embodiment of the disclosure.

An example of the thickness of the substrate affecting the return loss and phase response is illustrated in FIGS. 9A and 9B. The reflection loss and phase are plotted in FIGS. 9A and 9B, respectively for substrate thicknesses of h=2 mm, 1 mm, 0.7 mm, and 0.5 mm. The material parameters are as follows:

mur=1;

er=4.4−0.01*sqrt(−1).

The design frequency of about 27.5 GHZ may be affected by the thin film or substrate resonance if the thickness h of the substrate is larger than 0.7 mm, as shown in FIG. 8A. For example, when the thickness h=2 mm, the substrate resonances shift down to about 20 GHz. When the thickness h of the substrate is 1 mm, the resonance frequency shifts down to about 40 GHz. A starting substrate thickness may be selected based on the elimination of the film or substrate resonance from the design frequency range, such as about 27.5 GHZ, by pushing the substrate resonance frequency towards higher frequencies.

A thinner substrate may also narrow the phase range. As shown in FIG. 9B, when the thickness h=0.5 mm, the phase range is smaller than that when the thickness h=0.7 mm.

When the thickness is 1 mm, the phase range is even larger than that when the thickness h=0.7 mm.

Figure 10A:
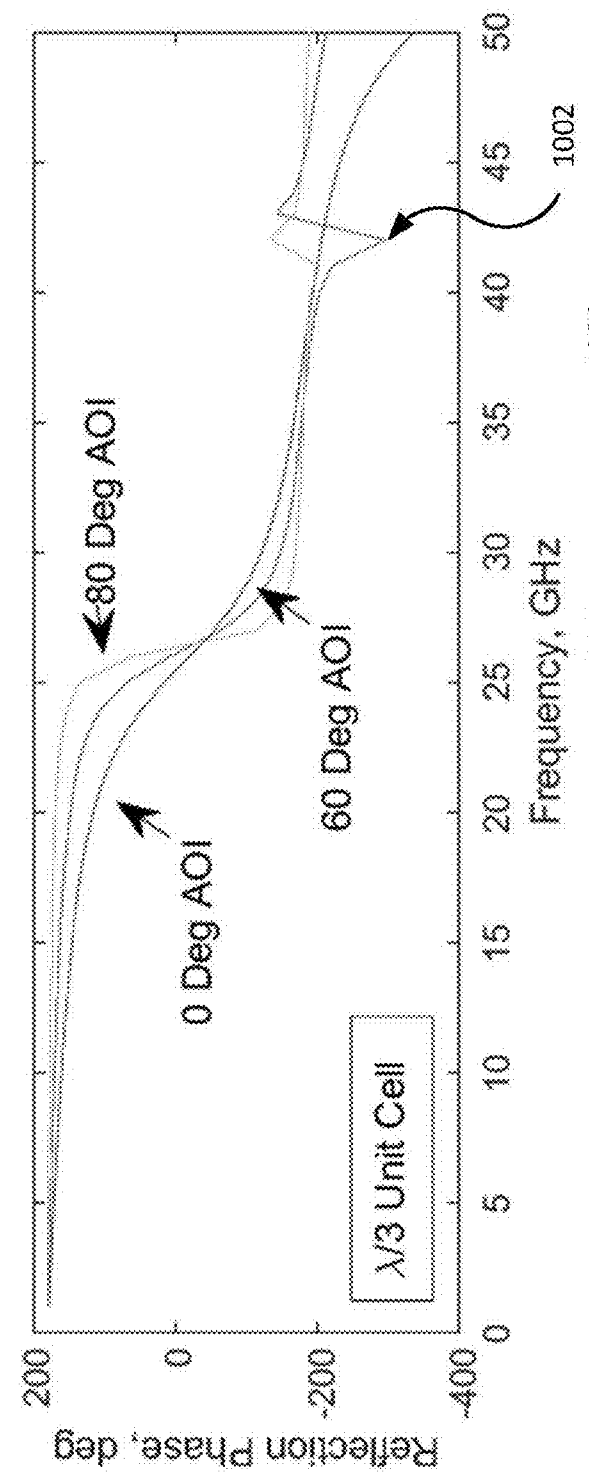
FIG. 10A is a graphic representation showing the reflection versus frequency for a unit cell having $\lambda_{0\,0}/3$ size at various angles of incidences (AOIs) according to an embodiment of the disclosure.
Figure 10B:
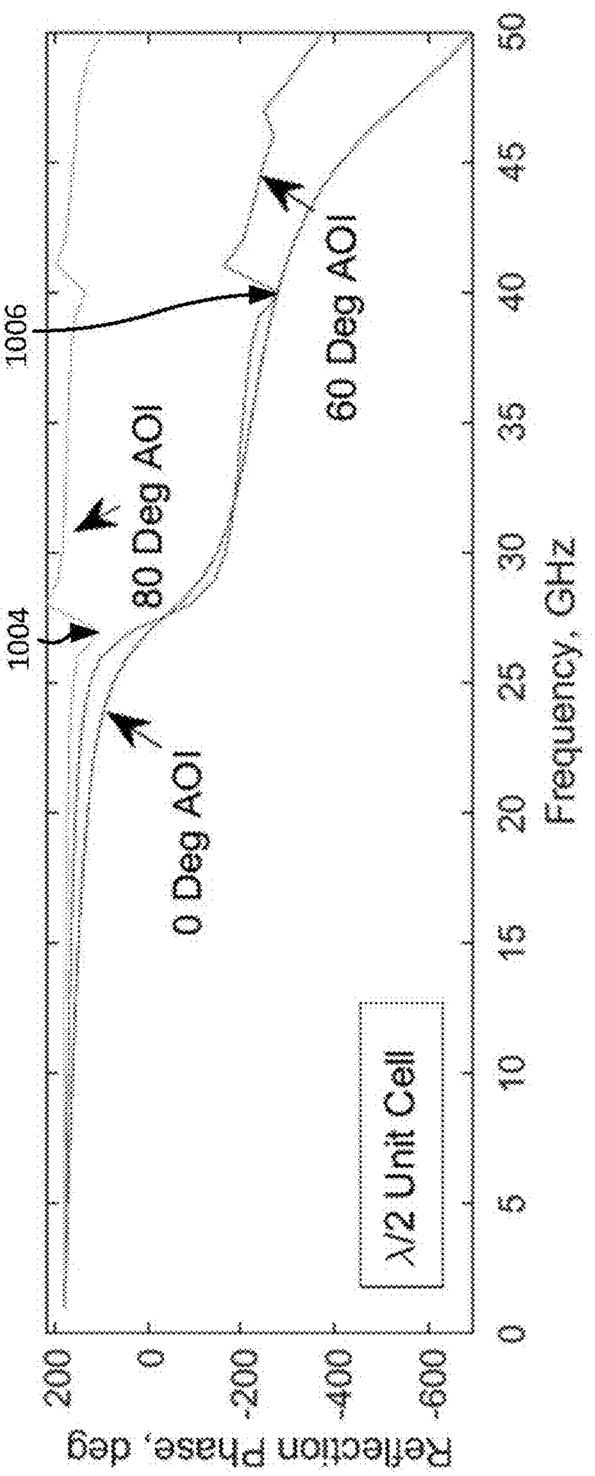
FIG. 10B is a graphic representation showing the reflection versus frequency for a unit cell having $\lambda_{0\,0}/2$ size at various angles of incidences (AOIs) according to an embodiment of the disclosure.

An example of the higher-order modes affecting the fundamental resonance and phase response is illustrated in FIGS. 10A and 10B. A graphic representation showing the reflection versus frequency for a unit cell having $\lambda_0/3$ size at various angles of incidence (AOI) is depicted in FIG. 10A according to an embodiment of the disclosure. A graphic representation showing the reflection versus frequency for a unit cell having $\lambda_0/2$ size at various angles of incidence (AOI) is depicted in FIG. 10B according to an embodiment of the disclosure. The design frequency is about 27.5 GHZ, and phase response is plotted as a function of frequency for about 0 degrees, about 60 degrees, and about 80 degrees of angle of incidence (AOI). As seen in FIG. 10A, when the unit cell size is about one-third of the free-space wavelength, higher-order resonances 1002 are higher than 40 GHz, which is out of the range of design frequency of about 27.5 GHz. As seen from FIG. 10B, when the unit cell size is about half the free-space wavelength, at high AOIs, such as about 80 degrees, higher-order resonances 1004 are between 25 GHz and 30 GHz, thus moving into the range of design frequency of about 27.5 GHz and operation of the metasurface is disturbed. The above examples demonstrate that smaller unit cells can shift the higher-order resonances to higher frequencies.

The unit cell size may vary with the AOI. As illustrated in FIG. 10B, for a unit cell size of half of the free-space wavelength or $\lambda_0/2$, the higher-order resonance 1006 shifts to about 40 GHz for about 60 degrees of AOI. As such, the reflectarray can still work at about 60 degrees of AOI with some changes in phase and efficiency. The resonance of the reflectarray would be significantly perturbed at about 80 degrees of AOI and would not function properly.

In some variations, the sizes of the unit cell may be selected such that the phase range may allow certain beam deflection and beam widening for a given target efficiency. The target efficiency may be equal to 80% or greater. Based on the target efficiency, ranges for various dimensions can be defined, including minimum and/or maximum limits according to the target beam deflection, the angles of incidence, and the target efficiency values.

In some variations, the unit cell size of the metasurface may range from $\lambda_0/4$ to $\lambda_0/2$.

In some variations, the unit cell size of the metasurface may range from $\lambda_0/4$ to $\lambda_0/3$.

In some variations, a size of each unit cell of the plurality of unit cells is less than $\lambda_0/4$ to $\lambda_0/2$ in free space, $\lambda_0$ being a wavelength of an RF wave in free-space corresponding to the design frequency of the metasurface.

Figure 11:
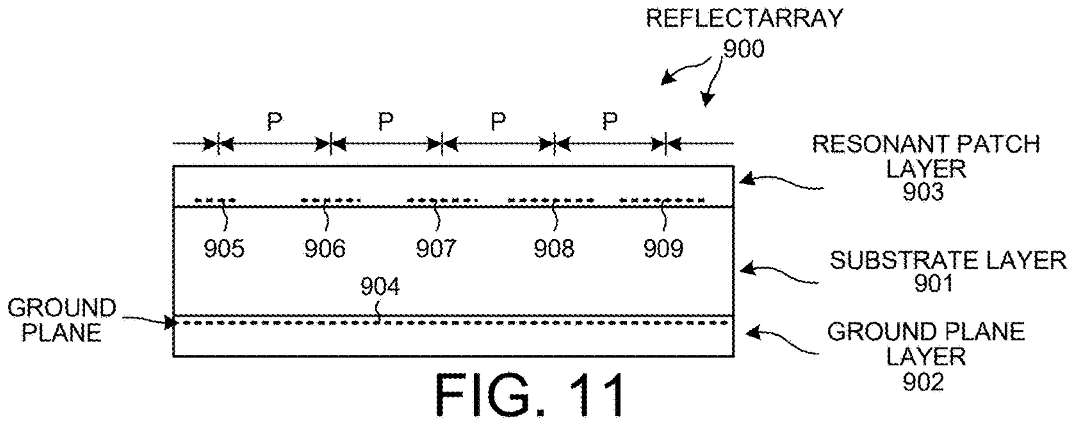
FIG. 11 is a simplified diagram of another embodiment of a reflectarray.

FIG. 11 is a simplified diagram of another embodiment of a reflectarray 900. In this specific embodiment, the reflectarray 900 is designed and then fabricated to reflect 5G (fifth-generation mobile network telecommunications technology) RF energy of about 27.5 gigahertz. Reflectarray 900 includes a substrate layer 901, a ground plane layer 902, and a resonant patch layer 903. In one example, substrate layer 901 is between 0.3 millimeters and 1.0 millimeters thick, and is preferably 0.7 millimeter thick layer of an optically transparent flexible polymer. In another example, substrate layer 901 is a layer of glass. Reflectarray 900 is a relatively large structure, at least two feet by two feet in size. The reflectarray 900 is said to be transparent, and has an average visible light transmittance for light in the visible wavelength band (380 nanometers to 780 nanometers) that is eighty percent or more.

In this specific embodiment, ground plane layer 902 is a relatively thin optically transparent layer that includes a ground plane 904. The ground plane 904 is a mesh of conductive microwires. The term "microwire" is used here to denote a very thin conductive element that has a line width that is less than about ten microns, and is typically in the range of from one micron to eight microns. In an imprint-and-fill technique example, a substrate layer of a transparent polymer film has disposed upon it a UV curable resin layer. A template with very fine raised features is used to emboss a pattern of microtrenches into the surface of the UV curable resin, and thereafter the resin is cured. The microtrenches in the resin are then filled with a curable conductive ink. This conductive ink is cured to form the micowires. The microwires may, for example, have a maximum line width that is less than eight microns so that they are invisible or substantially invisible to the naked eye. The thickness of the resin layer in one example is approximately five microns. Once the ground plane layer 902 is formed in this way, the ground plane layer 902 is laminated to the substrate layer 901 as shown so that the side of the ground plane layer 902 bearing the microwires is facing the substrate layer 901. The microwires are fabricated so that the sheet resistance of the ground plane is less than ten ohms per square.

In this specific embodiment, the resonant patch layer 903 is formed in same way as the ground plane layer 902 described above, except that the microwire pattern is such that a two-dimensional array of conductive mesh resonant patches is formed. Reference numerals 905-909 identify resonant patches in the diagram. The reflectarray 900 is a passive device, of fixed composition and structure, so the overall reflectarray including the dimensions and types of materials is designed to reflect the desired RF energy (27.5 gigahertz) in a predetermined way. How the resonant patches of the resonant patch layer 903 are sized and spaced determines how the reflectarray will affect an incoming beam of RF energy. To make a reflectarray that reflects an incident RF beam with a given angle of incidence as reflected RF energy having a desired angle of reflection, multiple different sized resonant patches are provided on the same substrate as described in the patent specification above. In the specific embodiment of FIG. 11, the resonant patches are square areas of conductive mesh, where the sizes of the patches range from 0.1 millimeter square to 3.5 millimeter square, with the size of the patches increasing linearly in a direction of travel across the surface of reflect array. This is illustrated in FIG. 11 by showing the leftmost resonant patch 905 having the smallest area, and with each successive resonant patch extending in the diagram to the right having an ever larger area. The periodicity P of the resonant patches in this example is 3.5 millimeters. The distance from the center of one resonant patch to the center of an adjacent resonant patch is 3.5 millimeters, even though the areas of the individual patches may be different. The microwires of the resonant patches are fabricated such that the sheet resistance of each resonant patch is less than ten ohms per square, and this is important for the efficiency of the reflectarray.

The resulting reflectarray 900 is a transparent and flexible sheet. This sheet can be attached to another planar surface in order to provide a reflector that redirects RF energy in a predetermined way. Because the reflectarrays are passive devices that when manufactured have preset and predetermined reflecting characteristics, multiple different types of reflectarrays are made and inventoried, with each different type providing a different type of reflection and dispersion of a 27.5 gigahertz 5G RF signal. A desired operational environment for the reflectarray is determined and analyzed, and then a particularly suitable type of reflectarray is provided and positioned in the location so as to achieve the desired reflection and dispersion. A first reflectarray positioned at a first location in a building may have a different resonant patch construction as compared to the resonant patch construction of a second reflectarray positioned at a second location in the same building.

Figure 12:
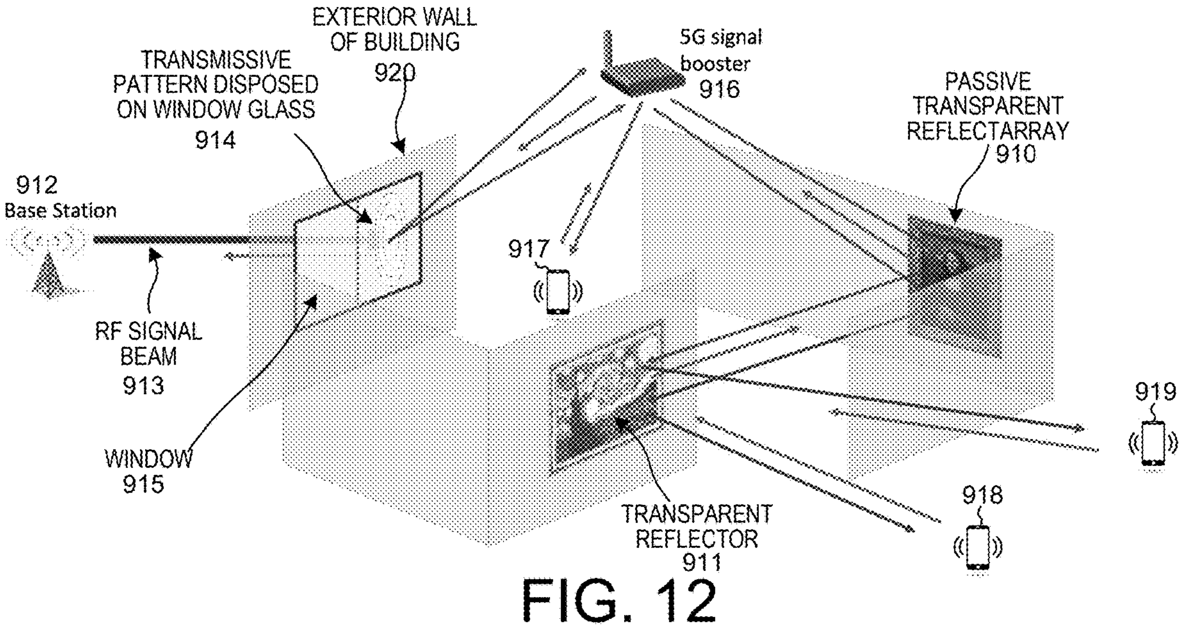
FIG. 12 is a simplified diagram of a first system involving two reflectarrays disposed inside a building, with the reflectarrays directing RF signal communications between cellular mobile devices in the building and a base station disposed outside the building.

FIG. 12 is a schematic diagram of a first system involving a pair of reflectarrays 910 and 911 disposed inside a building 920. A remote 5G base station 912 transmits 27.5 gigahertz 5G RF energy including RF signal beam 913. This beam 913 typically travels a significant distance of miles before reaching the building. A special reflectarray having a permissive pattern 914 may be provided on the window 915 of the building 920 such that the incoming RF beam 913 passes through the glass of the window, and is redirected at a desired angle as shown to a 5G signal booster device 916. The 5G signal boosting device 916 relays the RF signal within the building as illustrated. Reference numerals 917, 918 and 919 identify 5G cellular mobile devices that intercommunicate with the base station 912 using the 5G signal booster 916. Some RF energy passes from the 5G signal booster 916 as illustrated to the first passive transparent reflectarray 910. In the illustrated example, this first passive transparent reflectarray 910 is provided within the building in the form of a wall hanging or picture or painting or poster. Because the reflectarray 910 is transparent, the reflectarray 910 can be a layer disposed in front of the artwork, with the artwork of the wall hanging being visible to occupants of the building through the reflectarray. The specific type of reflectarray 910 and the location and the mounting of the reflectarray 910 are chosen such that RF energy is reflected to the second passive transparent reflectarray 911. The second passive transparent reflectarray 911 in turn reflects RF energy as illustrated to the location of cellular mobile devices 918 and 919. Communications between the base station 912 and each of the mobile devices 918-919 is bidirectional. A 5G RF transmission from one of the mobile devices 918-919 back to the base station 912 follows roughly the same signal path as RF energy passing in the other direction from the base station to the mobile device, only the efficiency is somewhat less than the efficiency of the base station to mobile device transmission.

Figure 13:
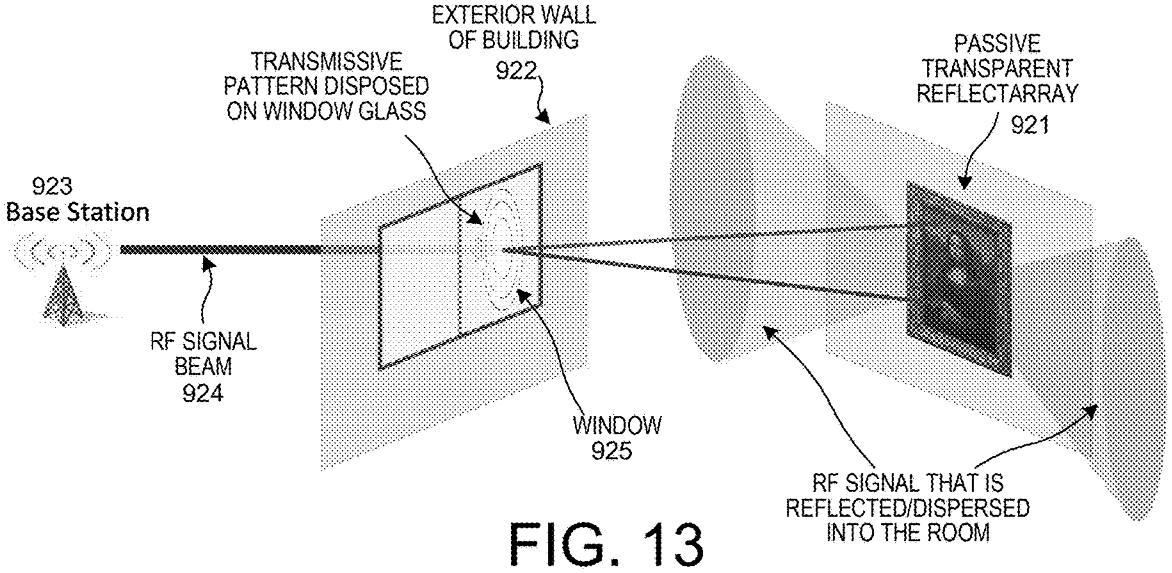
FIG. 13 is a simplified diagram of a second system involving a reflectarray disposed in a building.

FIG. 13 is a diagram of a second system involving a reflectarray 921, an no signal booster, disposed in a building 922. Remote 5G base station 923 transmits 27.5 gigahertz RF energy including RF signal beam 924. This RF beam 924 typically travels a significant distance of miles before reaching the building as in the example of FIG. 13. A special reflectarray having a permissive pattern may be provided on the window 925 to direct more of the RF energy to the second transparent reflectarray 921 as illustrated. The reflectarray 921 reflects and disperses the RF signal into the room. Although the reflectarrays of FIG. 12 and FIG. 13 are described as being parts of wall hangings, the reflectarrays can be provided in other ways. A reflectarray can, for example, be provided in the form of a film that is applied to a wall or a ceiling. A reflectarray can, for example, be provided as an auxiliary wall board that is attached over typical gypsum wall board of a home in a decorative fashion. Although the reflectarrys of FIG. 12 and FIG. 13 are described with examples in which the ground plane and the resonant features are conductive mesh structures, the ground plane and/or the resonant features can be made from another conductive sheet material, but in the preferable case the material is such that the sheet resistance of the ground plane and the resonant features is less than about ten ohms per square.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A passive reflectarray comprising:

an optically transparent substrate that has a thickness in a range from 0.3 millimeters to 1.0 millimeters;

a metasurface comprising a two-dimensional array of a plurality of resonant patches disposed over the optically transparent substrate, each resonant patch comprising a substantially planar first optically transparent conductor, wherein the first optically transparent conductor has a sheet resistance of less than ten ohms per square and comprises a mesh of microwires, wherein the microwires of the resonant patches have a maximum line width that is less than eight microns, wherein the size of each of the resonant patches is in a size range of from 0.1 millimeters square to 3.5 millimeters square, wherein a first resonant patch of the plurality of resonant patches has a major surface area of a first size, and wherein a second resonant patch of the plurality of resonant patches has a major surface area of a second size; and an optically transparent ground plane comprising a second optically transparent conductor disposed under the optically transparent substrate, wherein the second optically transparent conductor is substantially planar and has a sheet resistance of less than ten ohms per square and comprises a mesh of microwires, wherein the microwires of the optically transparent ground plane have a maximum line width that is less than eight microns, wherein the passive reflectarray has an optical transmittance that is eighty percent or more in a visible wavelength band from 380 nanometers to 780 nanometers.

2. The passive reflectarray of claim 1, further comprising a reflection profile configured to be a beam deflector and to implement an Echelle grating having an aperture size of about $3\lambda_0$ to about $30\lambda_0$ and a blazing angle of about 1° to about 40°, $\lambda_0$ being a wavelength of an RF wave in free-space corresponding to a design frequency of the metasurface.

3. The passive reflectarray of claim 1, wherein the metasurface comprises a linear phase gradient.

4. The passive reflectarray of claim 1, wherein at least one resonant patch of the array of resonant patches is ring-shaped, square, rectangular, or circular shaped.

5. The passive reflectarray of claim 1, wherein an RF wave produced by the reflectarray has a frequency ranging from about 5 GHz to about 30 GHz.

6. The passive reflectarray of claim 1, wherein the optically transparent substrate comprises glass or a polymer.

7. The passive reflectarray of claim 1, wherein the metasurface comprises silver (Ag), indium tin oxide (ITO), or nanoparticle-doped silica.

8. The passive reflectarray of claim 1, wherein the metasurface comprises nanowire meshes made by one of electrospun fiber templates, crack lithography, or spinning layers of metallic nanowires.

* * * * *